United States Patent
Takahashi

(10) Patent No.: US 11,254,363 B2
(45) Date of Patent: Feb. 22, 2022

(54) VEHICLE BODY FRONT STRUCTURE

(71) Applicant: HONDA MOTOR CO., LTD., Tokyo (JP)

(72) Inventor: Yuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 16/839,102

(22) Filed: Apr. 3, 2020

(65) Prior Publication Data

US 2020/0339198 A1    Oct. 29, 2020

(30) Foreign Application Priority Data

Apr. 23, 2019 (JP) .............. JP2019-082070

(51) Int. Cl.
  *B62D 25/04* (2006.01)
  *B60R 13/04* (2006.01)
  *B60R 13/06* (2006.01)

(52) U.S. Cl.
  CPC .............. *B62D 25/04* (2013.01); *B60R 13/04* (2013.01); *B60R 13/06* (2013.01)

(58) Field of Classification Search
  CPC .......... B62D 25/04; B60R 13/04; B60R 13/06
  USPC ........................................ 206/193.06, 96.18
  See application file for complete search history.

(56) References Cited

FOREIGN PATENT DOCUMENTS

| GB | 2318551 | * | 4/1998 |
|---|---|---|---|
| JP | 62-072845 | | 5/1987 |
| JP | 2001-071830 | | 3/2001 |
| JP | 2003-276519 | | 10/2003 |
| JP | 2005-125946 | | 5/2005 |
| JP | 4244558 | | 3/2009 |

OTHER PUBLICATIONS

Japanese Office Action for Japanese Patent Application No. 2019-082070 dated Jan. 12, 2021.

* cited by examiner

*Primary Examiner* — Dennis H Pedder
(74) *Attorney, Agent, or Firm* — Amin, Turocy & Watson, LLP

(57) ABSTRACT

A vehicle body front structure includes a front pillar extending in an upward/downward direction, a front glass disposed further inward in a vehicle width direction of a vehicle body than the front pillar, a subsidiary glass disposed further outward in the vehicle width direction than the front glass, and a garnish configured to cover a gap provided between end portions of the front glass and the subsidiary glass, and to cover the front pillar from an outside of a passenger compartment. The garnish has an engaging section disposed in the gap between the end portions of the front glass and the subsidiary glass and standing up toward the front pillar, and the front pillar has a clip section to which the engaging section is able to engage.

8 Claims, 9 Drawing Sheets

VEHICLE BODY FRONT STRUCTURE

CROSS-REFERENCE TO RELATED APPLICATION

Priority is claimed on Japanese Patent Application No. 2019-082070, filed Apr. 23, 2019, the content of which is incorporated herein by reference.

BACKGROUND OF THE INVENTION

Field of the Invention

The present invention relates to a vehicle body front structure.

Description of Related Art

In the related art, various technologies in which a front pillar is provided between a front glass and a subsidiary glass of a vehicle and a field of vision of a driver is improved through reduction in size of the front pillar have been proposed.

For example, Japanese Unexamined Patent Application, First Publication No. 2005-125946 discloses a vehicle configuration in which an end portion of a front glass and an end portion of a delta window glass (a subsidiary glass) are adhered to flanges of both sides of a front pillar of the vehicle, respectively, and a garnish configured to cover the front pillar and both of the end portions from an outer side of a vehicle body is attached to the front pillar. According to the technology disclosed in Japanese Unexamined Patent Application, First Publication No. 2005-125946, a cross-sectional area of a front pillar having a hollow cross section can be reduced and a field of vision of a driver can be widened by fixing the garnish to the front pillar.

Japanese Patent No. 4244558 discloses a vehicle body front structure including a front pillar main body constituted by an integrated tubular member and an outer panel member coupled to a side surface of the tubular member on an outer side of a vehicle, a garnish seat section attached to any one of a front glass and a subsidiary glass through module forming, and a pillar garnish attached to the garnish seat section. According to the technology disclosed in Japanese Patent No. 4244558, since the front glass and the subsidiary glass are disposed adjacent to each other, a field of vision in front of a driver can be widened.

SUMMARY OF THE INVENTION

However, in the technology disclosed in Japanese Unexamined Patent Application, First Publication No. 2005-125946, although a hollow cross section is formed in a front pillar to increase a strength of the front pillar, further reduction in size of the front pillar is limited. Accordingly, there is a problem in narrowing a width of the front pillar seen from a driver to improve a field of vision.

In the technology disclosed in Japanese Patent No. 4244558, since the garnish is attached to any one of a front glass and a subsidiary glass through module forming, a fixing strength of a garnish with respect to a front pillar may not be secured sufficiently. Accordingly, problems remain in improving a degree of freedom in design of the front pillar and the garnish with respect to a complex vehicle body design and reducing manufacturing costs.

An aspect of the present invention is directed to providing a vehicle body front structure that can be manufactured at low cost and having an improved degree of freedom in design while a field of vision of a driver is improved.

(1) A vehicle body front structure according to the present invention includes a front pillar extending in an upward/downward direction; a front glass disposed further inward in a vehicle width direction of a vehicle body than the front pillar; a subsidiary glass disposed further outward in the vehicle width direction than the front glass; and a garnish configured to cover a gap provided between end portions of the front glass and the subsidiary glass, and to cover the front pillar from outside of a passenger compartment, the garnish having an engaging section disposed in the gap and standing up toward the front pillar, and the front pillar having a clip section to which the engaging section is able to engage.

(2) In the aspect of the above-mentioned (1), the front pillar may have a connecting section extending toward the garnish, and the clip section may be provided on the connecting section.

(3) In the aspect of the above-mentioned (1) or (2), the garnish may include: an outer part having a design surface facing outside from the passenger compartment; an inner part provided at inner side of the passenger compartment than the outer part and in which the engaging section is formed; an inner seal section in contact with the front glass; and an outer seal section in contact with the subsidiary glass.

(4) In the aspect of the above-mentioned (3), a thickness of the outer seal section side of the inner part may be increased from above toward below in the upward/downward direction.

(5) In the aspect of the above-mentioned (3) or (4), a height of an inner seal attachment leg section of the outer part provided at the side of the inner seal section may be increased from above toward below in the upward/downward direction.

(6) In the aspect of any one of the above-mentioned (3) to (5), the inner seal section may be fixed to the outer part, and the outer seal section may be fixed to at least one of the inner part and the outer part.

(7) In the aspect of any one of the above-mentioned (3) to (6), the outer part may have a support piece extending toward an inner side of the passenger compartment, and the support piece may be fastened and fixed to an extension section extending upward from the vehicle body at a lower end side in the upward/downward direction.

(8) In the aspect of the above-mentioned (7), the head section of the support piece and the inner part may be welded to each other while the support piece passes through the inner part in a thickness direction of the inner part.

(9) In the aspect of any one of the above-mentioned (1) to (8), the clip section may have a locking piece, the engaging section may have a stepped section engaged with the locking piece, and the garnish may be separable from the clip section when the engaging section is moved with respect to the clip section in a lengthwise direction of the front pillar.

(10) In the aspect of any one of the above-mentioned (1) to (9), the front pillar may be formed in a V-shaped cross section by a front support section to which the front glass is attached, and a side support section disposed further outward in the vehicle width direction than the front support section and to which the subsidiary glass is attached, and at least one of the front support section and the side support section may have a garnish fixing part to which the garnish is attached.

According to the aspect of the above-mentioned (1), the garnish has the engaging section, and the engaging section is disposed in the gap between the front glass and the subsidiary glass and engaged with the clip section of the front pillar while standing up toward the front pillar. Accordingly, the garnish can be fixed to the front pillar. Accordingly, a fixing strength of the garnish can be increased. In addition, since the end portions of the front glass and the subsidiary glass can be disposed adjacent to each other, a width dimension of the front pillar can be reduced, and a field of vision of a driver can be widened.

Since the engaging section is provided on the garnish and the garnish can be fixed to the front pillar simply by providing the clip section on the front pillar, a degree of freedom in design can be improved while the garnish and the front pillar are simply configured.

Accordingly, it is possible to provide a vehicle body front structure that can be manufactured at low cost and having an improved degree of freedom in design while a field of vision of a driver is improved.

According to the aspect of the above-mentioned (2), since the front pillar has the connecting section extending toward the garnish and the clip section is provided on the connecting section, the clip section can be disposed in the narrow gap between the front glass and the subsidiary glass. Accordingly, even when the end portions of the front glass and the subsidiary glass are disposed adjacent to each other and a width dimension of the front pillar is reduced, the garnish can be reliably fixed to the front pillar.

According to the aspect of the above-mentioned (3), since the garnish includes the inner part and the outer part, for example, design properties of the vehicle body, i.e., a degree of freedom in design can be improved using different molds upon molding of the inner part and the outer part. In addition, the inner part may be formed of, for example, a resin material or the like having high rigidity to facilitate mounting on the front pillar, and the outer part may be formed of, for example, a resin material or the like on which paint has good application properties to improve design properties. In this way, the rigidity and fixing strength of the garnish can be increased by selecting materials of the parts according to uses thereof. In addition, since the inner part is formed of a material having higher rigidity than that of the outer part, for example, the inner part can be easily mounted on the clip section formed of a metal material having high rigidity. Accordingly, it is possible to provide a vehicle body front structure that can be manufactured at low cost and having an improved degree of freedom in design.

According to the aspect of the above-mentioned (4), since the thickness of the outer seal section side of the inner part is increased from above toward below, a design line of the outer part and a design line of the fender panel disposed below the front pillar can be made to be smoothly continuous. Accordingly, it is possible to provide a vehicle body front structure having an improved appearance for the vehicle body.

According to the aspect of the above-mentioned (5), since the height of the inner seal attachment leg section provided at the side of the inner seal section of the outer part is increased from above toward below, a design line of the outer part and a design line of the fender panel disposed below the front pillar can be made to be smoothly continuous. Accordingly, it is possible to provide the vehicle body front structure having improved appearance of the vehicle body.

According to the aspect of the above-mentioned (6), since the inner seal section is fixed to the inner part and the outer seal section is fixed to at least one of the inner part and the outer part, adhesion between the glasses and the garnish can be increased, and intrusion of water, dust, or the like, between the garnish and the glass can be minimized.

According to the aspect of the above-mentioned (7), the outer part has the support piece and the garnish is fixed to the vehicle body when the support piece is fastened and fixed to the extension section. According to this configuration, for example, even when the engaging section of the inner part is separated from the clip section due to traveling air or the like, the garnish can be fixed to the vehicle body. Accordingly, the fixing strength of the garnish and safety of the vehicle body can be improved.

According to the aspect of the above-mentioned (8), since the head section of the support piece and the inner part are welded to each other while the support piece passes through the inner part in the thickness direction of the inner part, the outer part and the inner part can be strongly fixed. Accordingly, the fixing strength of the garnish can be improved.

According to the aspect of the above-mentioned (9), since the stepped section of the engaging section is engaged with the locking piece of the clip section, the garnish can be fixed to the front pillar. In addition, the engaging section can be separated from the clip section by moving the engaging section with respect to the clip section in the lengthwise direction of the front pillar. Accordingly, the garnish can be easily removed from the front pillar by moving the garnish in the lengthwise direction. Accordingly, it is possible to provide a vehicle body front structure in which attachment and detachment of the garnish are easily performed while the garnish is strongly fixed.

According to the aspect of the above-mentioned (10), since the front pillar is formed in a V-shaped cross section, the front pillar can be easily manufactured while the strength of the front pillar is increased and the width is reduced. Since at least one of the front support section and the side support section has the garnish fixing part, the garnish can be easily attached to the front pillar by attaching the garnish to the garnish fixing part. In particular, when the garnish fixing part is fixed to the front support section to which the front glass is attached, since the front support section is reinforced by the garnish fixing part, sufficient support strength with respect to the front glass having a greater weight than that of the subsidiary glass can be secured.

DETAILED DESCRIPTION OF THE INVENTION

Figure 1:
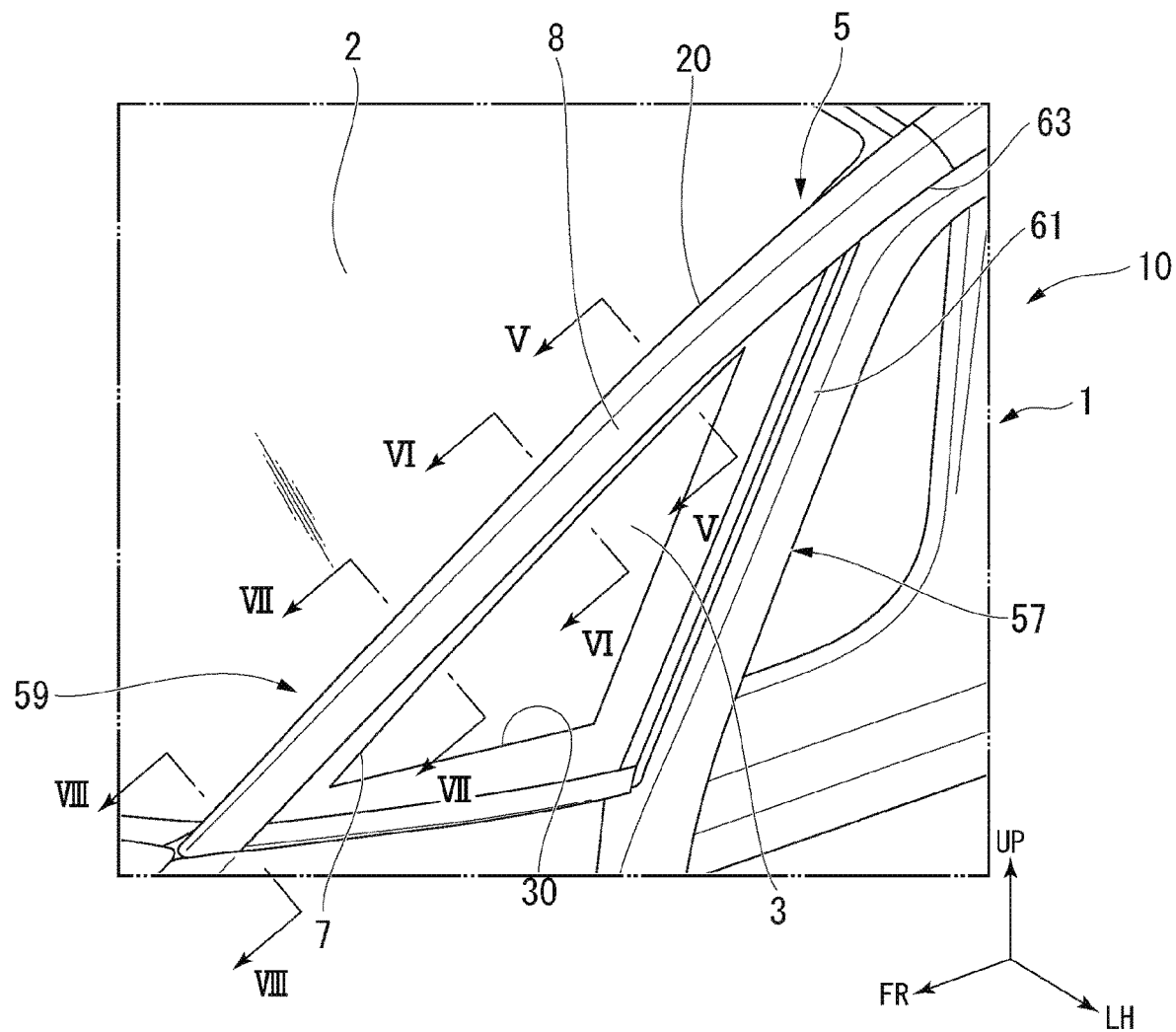
FIG. 1 is a perspective view of a vehicle body front structure according to an embodiment when seen from a front left side.

Hereinafter, an embodiment of the present invention will be described with reference to the accompanying drawings. In the drawings, an arrow FR indicates a forward direction with respect to a vehicle body, an arrow UP indicates an upward direction with respect to the vehicle body, and an arrow LH indicates a leftward direction with respect to the vehicle body. In addition, a vehicle width direction may be referred to as a leftward/rightward direction.

Embodiment (Vehicle Body Front Structure)

FIG. 1 is a perspective view of a vehicle body front structure 1 according to an embodiment when seen from a front left side.

The vehicle body front structure 1 is a structure disposed on a front side of a vehicle body 10. The vehicle body front structure 1 includes a front glass 2, subsidiary glasses 3, upper members 4 (see FIG. 2), and front pillars 5. The pair of subsidiary glasses 3, the pair of upper members 4 and the pair of front pillars 5 are provided on left and right sides.

The front glass 2 covers a front opening 20 provided in front of a cabin section of the vehicle body 10. The subsidiary glasses 3 are provided on both end portions of the front glass 2 in a vehicle width direction, and cover subsidiary openings 30 adjacent to the front opening 20 on both sides of the cabin section of the vehicle body 10. Each of the subsidiary glasses 3 is formed in a triangular shape.

Figure 2:
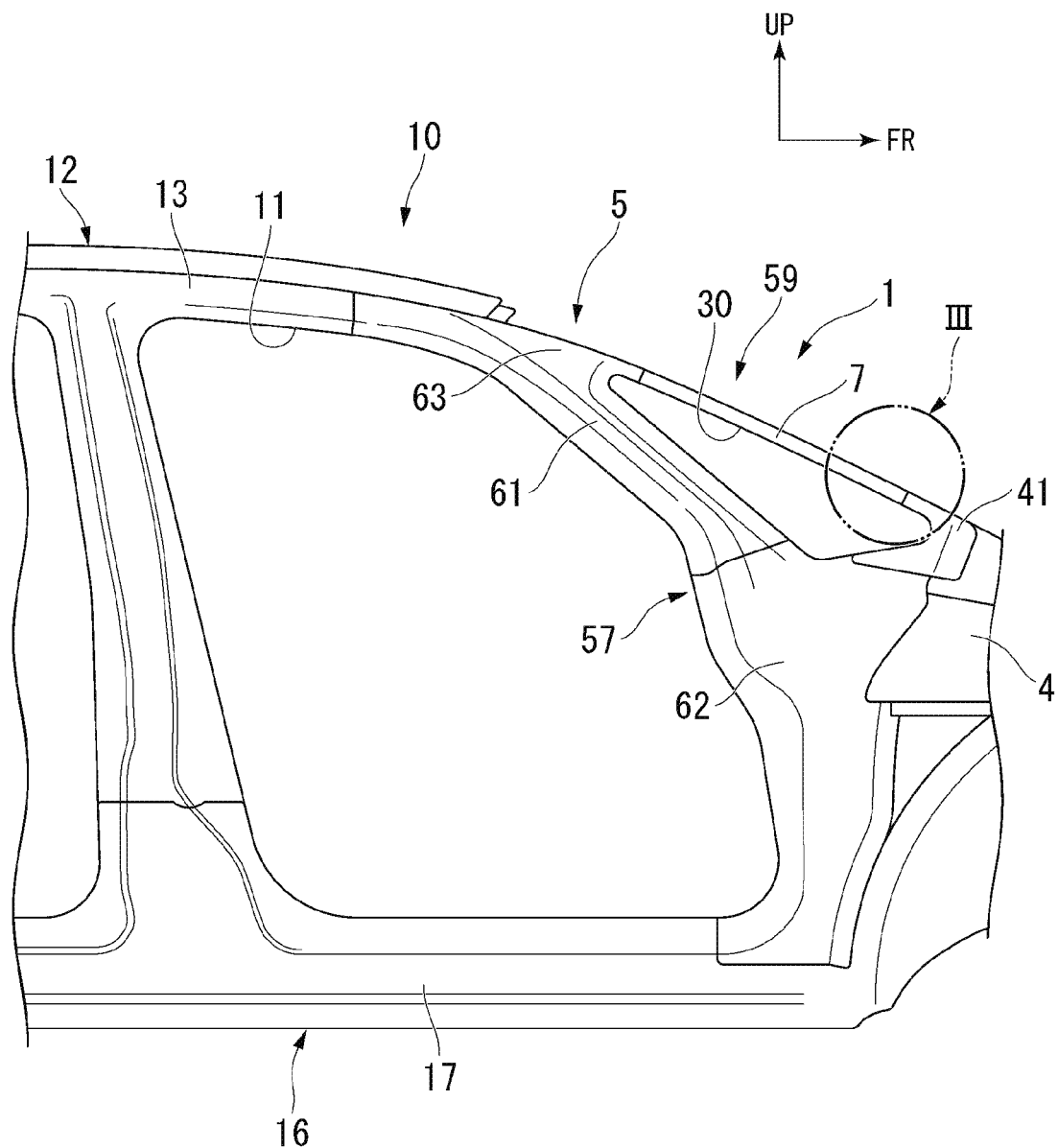
FIG. 2 is a side view of the vehicle body front structure according to the embodiment.

FIG. 2 is a side view of the vehicle body front structure 1 according to the embodiment.

The upper members 4 are provided in front of the subsidiary openings 30. The upper members 4 extend forward from front end portions of the subsidiary openings 30.

The front pillars 5 are disposed between a front door opening 11 of the vehicle body 10 and the upper members 4. Rear end portions of the front pillars 5 constitute a front portion of the front door opening 11. The subsidiary openings 30 are formed in upper sections of the front pillars 5. The pair of left and right front pillars 5 are provided outside the front glass 2 in the vehicle width direction. The front pillars 5 include main front pillars 57 and subsidiary front pillars 59.

The main front pillars 57 extend in an upward/downward direction to connect roof side rails 13 that constitute a roof 12 of the vehicle body 10 and side sills 17 that constitute a floor 16. The main front pillars 57 have front pillar upper parts 61 and front pillar lower parts 62.

The front pillar upper parts 61 are provided at upper section of the main front pillars 57, and upper end portions 63 are connected to a roof (not shown). The front pillar upper parts 61 constitute rear end portions of the subsidiary openings 30.

The front pillar lower parts 62 are provided at lower section of the main front pillars 57. Upper end portions of the front pillar lower parts 62 are connected to lower end portions of the front pillar upper parts 61. The upper end portions of the front pillar lower parts 62 constitute lower end portions of the subsidiary openings 30. The upper members 4 are connected to the front end portions of the front pillar lower parts 62.

The subsidiary front pillars 59 are provided in front of the main front pillars 57. The subsidiary front pillars 59 extend from the upper end portions 63 of the front pillar upper parts 61 toward the upper members 4. The subsidiary front pillars 59 are inclined downward from the rear toward the front. The subsidiary front pillars 59 constitute the upper end portions of the subsidiary openings 30. The subsidiary front pillars 59 include studs 7 and garnishes 8.

(Stud)

The studs 7 are provided in front of the front pillar upper parts 61. The studs 7 extend from the front pillar upper parts 61 toward the upper members 4. Specifically, the studs 7 are inclined downward from the rear toward the front. The upper end portions of the studs 7 are attached to the upper end portions 63 of the front pillar upper parts 61. The lower end portions of the studs 7 are attached to extension sections 41 extending upward from the upper members 4.

Figure 3:
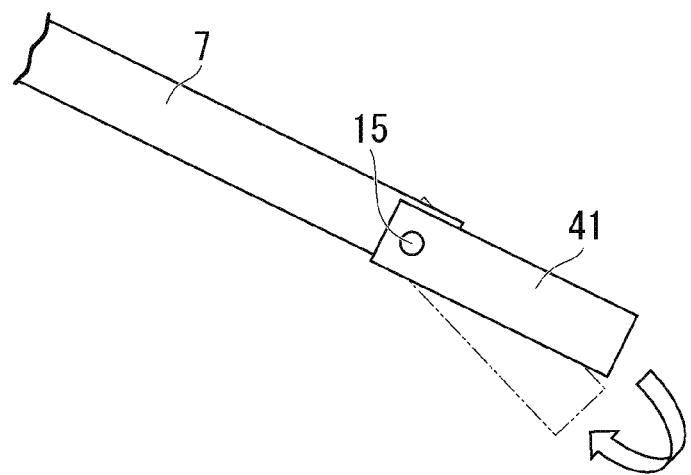
FIG. 3 is an enlarged view of a portion III in FIG. 2.

FIG. 3 is an enlarged view of a portion III in FIG. 2 showing the lower end portion of the stud 7. The lower end portions of the studs 7 are rotatably pivoted with respect to the extension sections 41 by fastening members such as bolts 15 or the like. Further, the studs 7 and the extension sections 41 may be rotatably attached to each other at a fixed point, or may be pivoted by, for example, riveting, caulking, or the like, in addition to bolts or the like. In addition, the upper end portions of the studs 7 may also be pivoted with respect to the upper end portions 63 of the front pillar upper parts 61.

Figure 4:
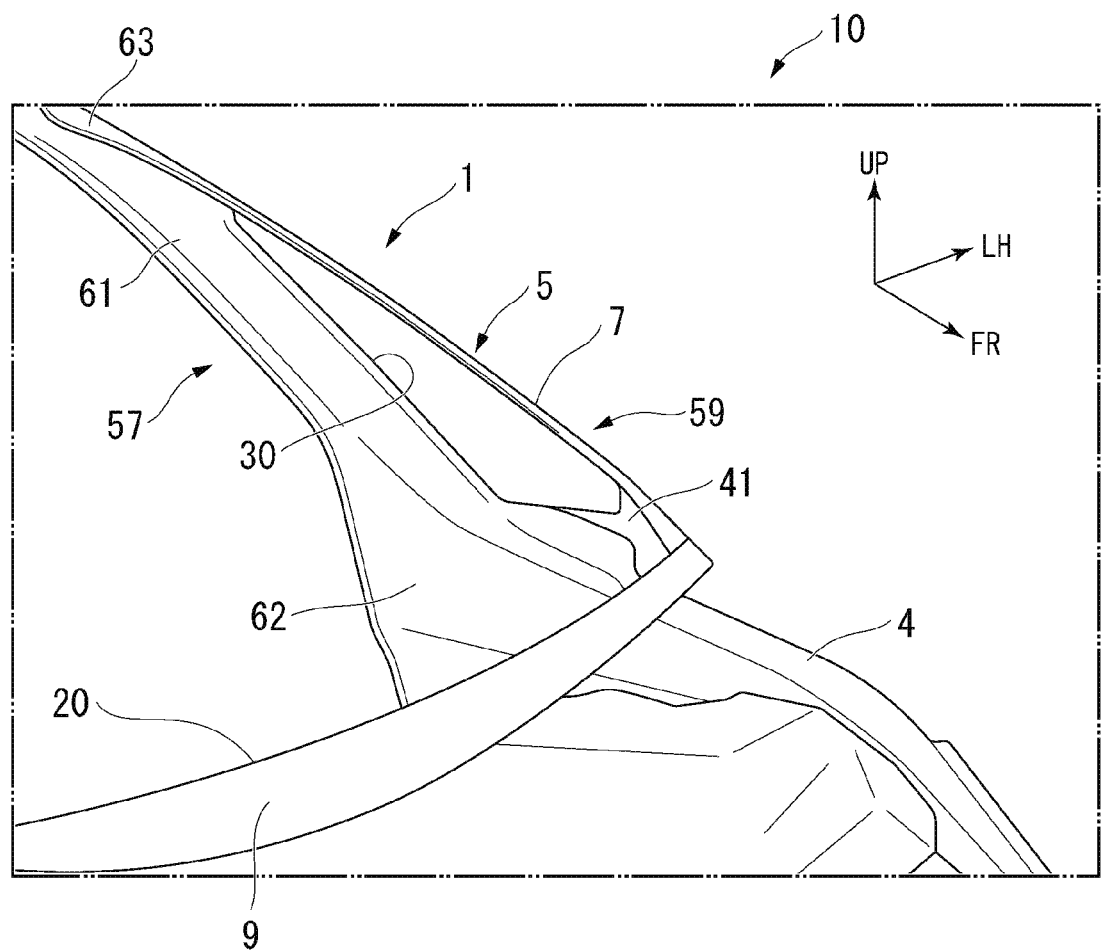
FIG. 4 is a perspective view of the vehicle body front structure according to the embodiment when seen from a front right side.

FIG. 4 is a perspective view of the vehicle body front structure 1 according to the embodiment when seen from a front right side.

A cross rail 9 extending in the vehicle width direction is disposed on the lower end portion of the studs 7. The cross rail 9 is supported by the upper members 4 via the extension sections 41. In other words, the extension sections 41 bridge between the upper members 4 and the cross rail 9.

Figure 5:
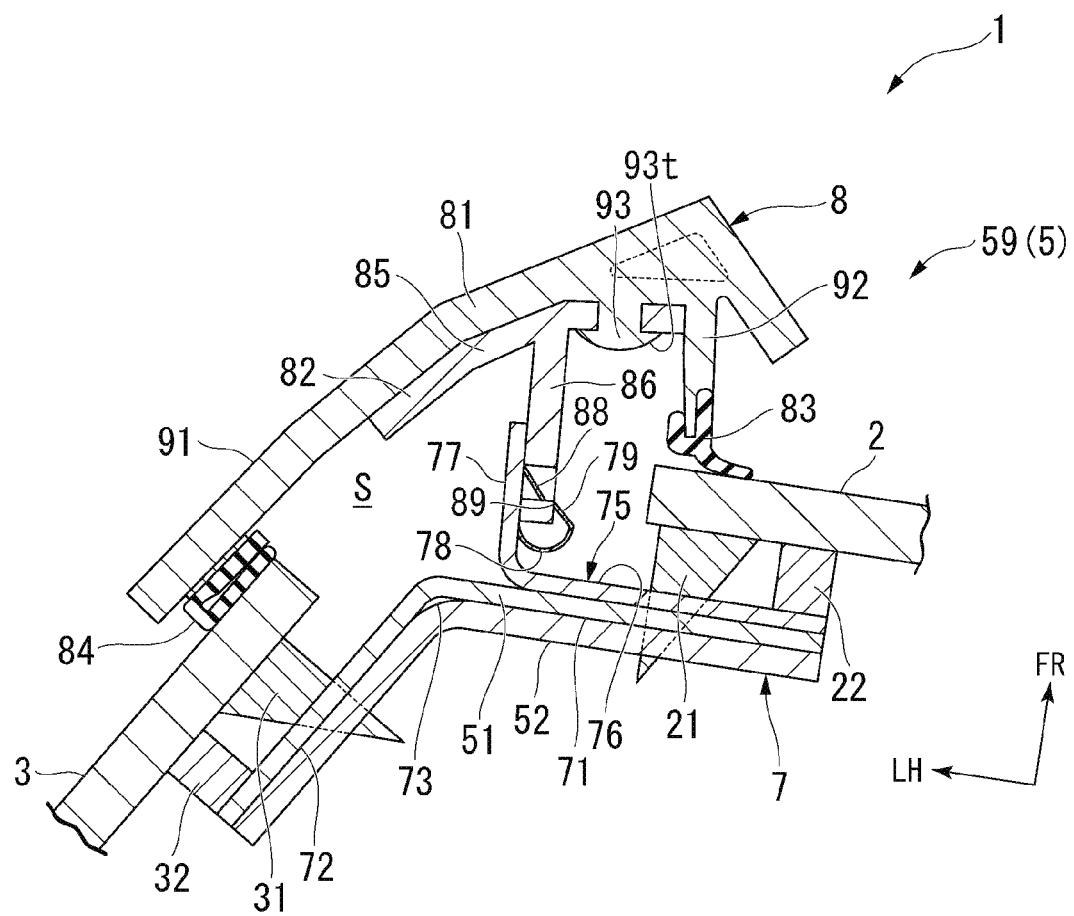
FIG. 5 is a cross-sectional view taken along line V-V in FIG. 1.
Figure 6:
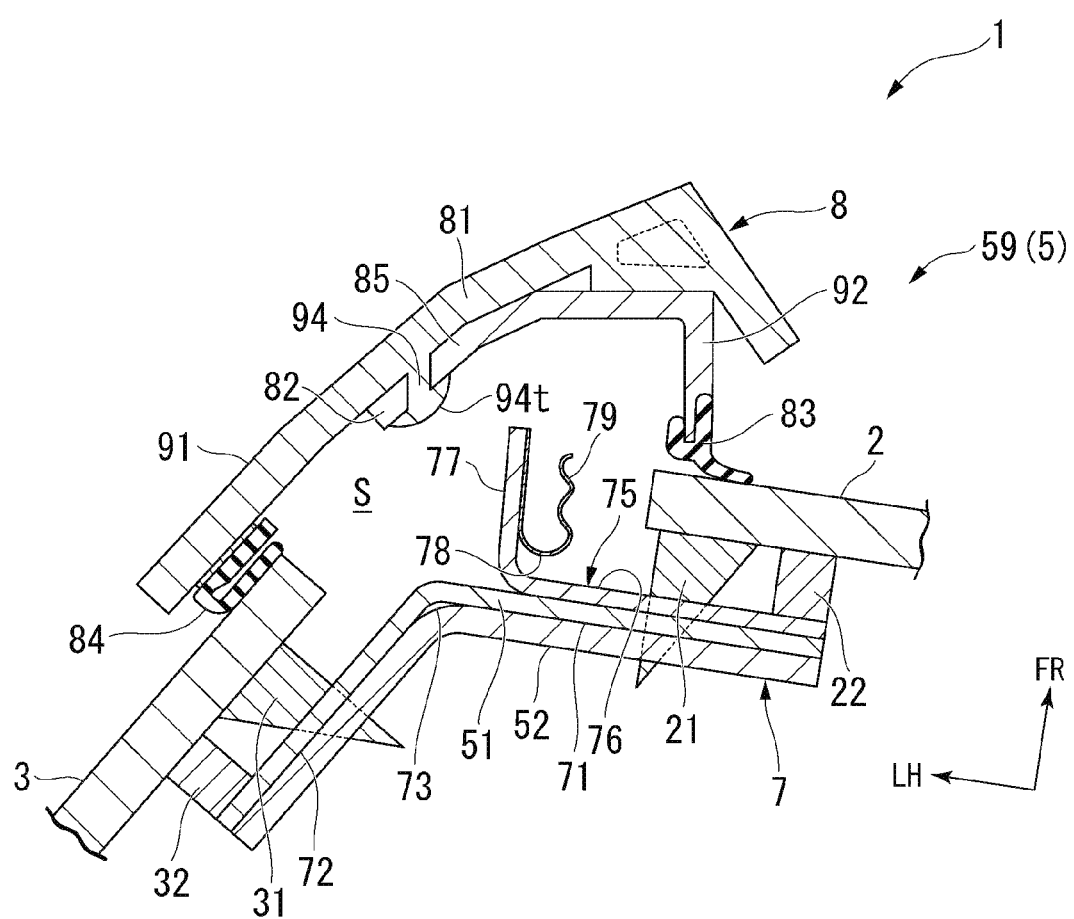
FIG. 6 is a cross-sectional view taken along line VI-VI in FIG. 1.
Figure 7:
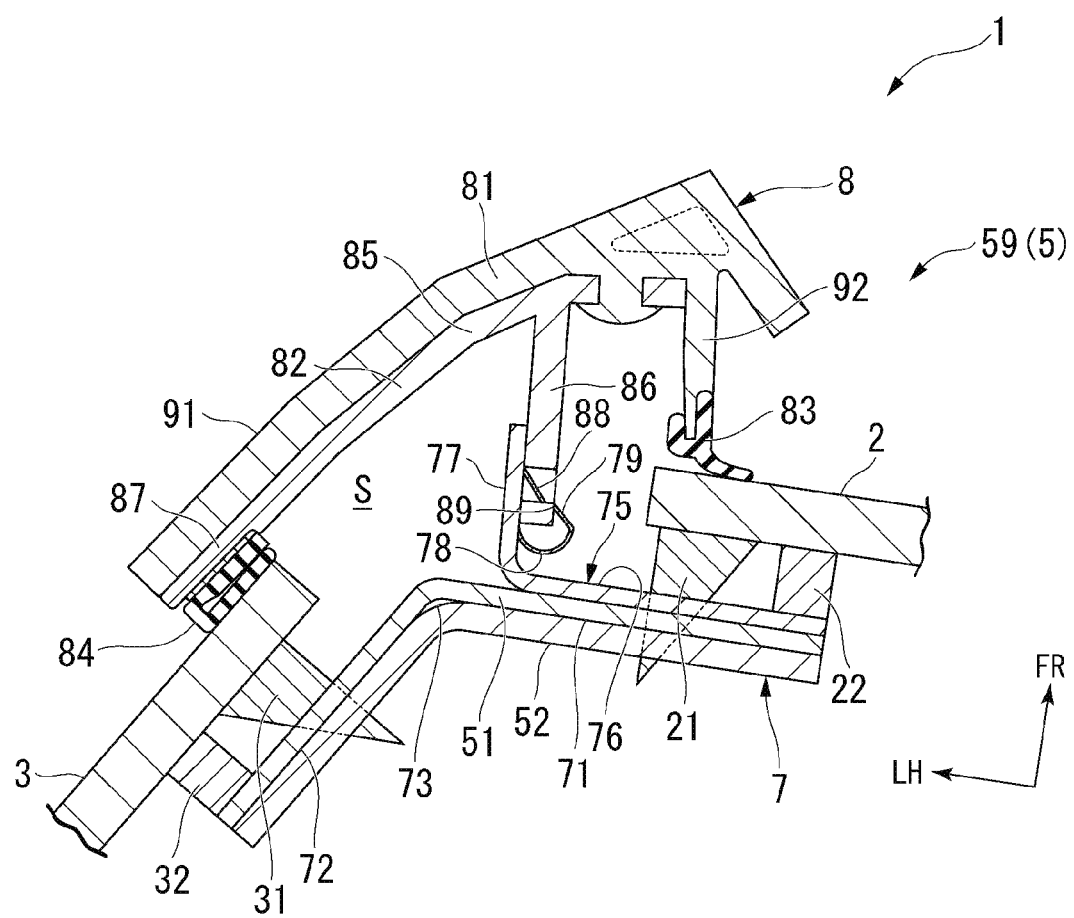
FIG. 7 is a cross-sectional view taken along line VII-VII in FIG. 1.
Figure 8:
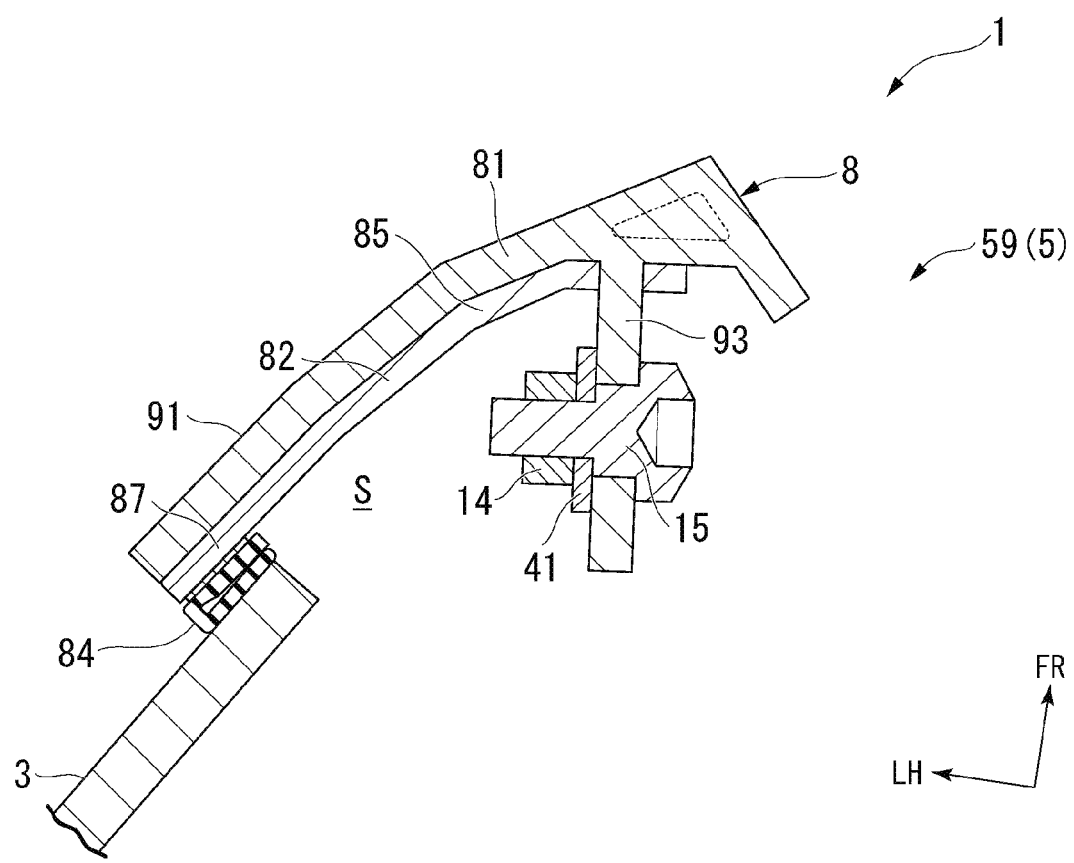
FIG. 8 is a cross-sectional view taken along line VIII-VIII in FIG. 1.

FIG. 5 is a cross-sectional view of the subsidiary front pillar 59 taken along line V-V in FIG. 1. FIG. 6 is a cross-sectional view taken along line VI-VI in FIG. 1. FIG. 7 is a cross-sectional view taken along line VII-VII in FIG. 1. FIG. 8 is a cross-sectional view taken along line VIII-VIII in FIG. 1.

As shown in FIG. 5, the studs 7 are formed in a V shape protruding outward from the passenger compartment when seen in a cross-sectional view perpendicular to an extension direction of the studs 7. Specifically, the studs 7 are formed such that a first plate member 51 and a second plate member 52 having the same shape overlap each other in the forward/rearward direction. The front glass 2, the subsidiary glasses 3 and the garnishes 8 are fixed to the first plate member 51. Fixing brackets (none is shown) of an indoor garnish configured to cover the studs 7 from an inner side of the passenger compartment are fixed to the second plate member 52 disposed behind the first plate member 51. When seen in a cross-sectional view along line V-V, the studs 7 are formed in a V shape and have bent sections 73. Portions of the studs 7 located further inward in the vehicle width direction than the bent sections 73 are referred as front support sections 71, and portions located further outward in the vehicle width direction than the bent sections 73 are referred as side support sections 72. A width dimension of the front support sections 71 in the leftward/rightward direction and a width dimension of the side support sections 72 in the forward/rearward direction are set to be equal to each other.

The front glass 2 is attached to the front support sections 71. Specifically, the front glass 2 is fixed to the studs 7 by a front-side adhesive agent 21 provided between the front support sections 71 and the front glass 2. Front-side seal members 22, in addition to the front-side adhesive agent 21, are provided between the front support sections 71 and the front glass 2. The front-side seal members 22 are provided on a side in which the front-side seal members 22 are far from the bent sections 73 than the front-side adhesive agent 21.

The subsidiary glasses 3 are attached to the side support sections 72. Specifically, the subsidiary glasses 3 are fixed to the studs 7 by a subsidiary side adhesive agent 31 provided between the side support sections 72 and the subsidiary glasses 3. Subsidiary side seal members 32, in addition to the subsidiary side adhesive agent 31, are provided between the side support sections 72 and the subsidiary glasses 3. The subsidiary side seal members 32 are provided on a side in which the subsidiary side seal members 32 are far from the bent sections 73 than the subsidiary side adhesive agent 31.

A garnish fixing part 75 is attached to the front support section 71. The garnish fixing part 75 is formed in an L shape when seen in a cross-sectional view along line V-V by a joining section 76 fixed to the front support section 71 along the front support section 71 and a connecting section 77 extending from the end portion of the joining section 76 toward the garnish 8. The connecting section 77 is connected to an end portion of the joining section 76 on the side closer to the bent section 73. The connecting section 77 is disposed in a gap S between the end portions of the front glass 2 and the subsidiary glass 3 and extends outward from the passenger compartment. A clip section 78 is attached to a surface of the connecting section 77 facing an inward side in the vehicle width direction.

Figure 9:
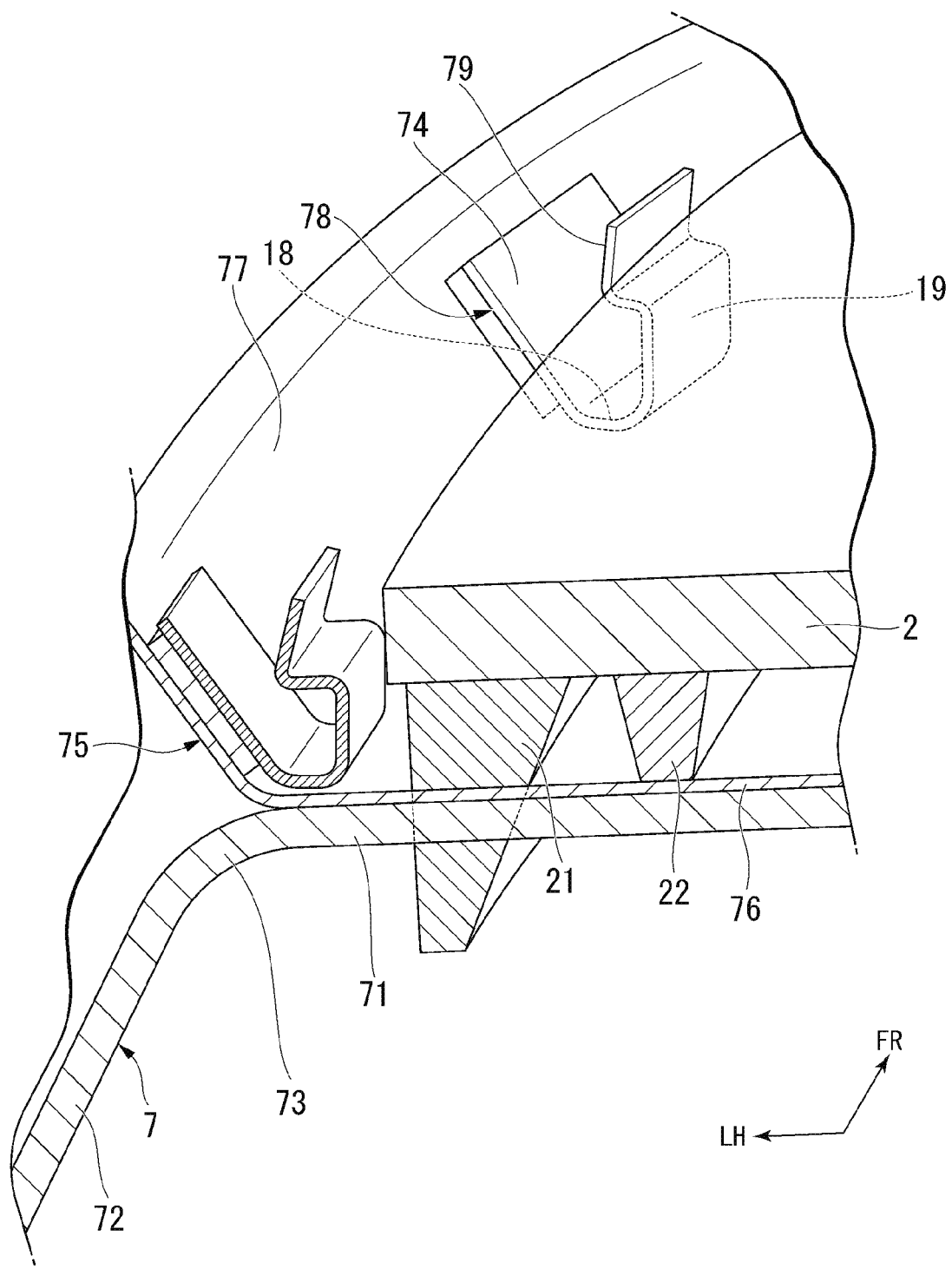
FIG. 9 is a perspective view of a clip section according to the embodiment.

FIG. 9 is a perspective view of the clip section 78.

The plurality of clip sections 78 are provided at predetermined intervals in an extension direction of the stud 7. Each of the clip sections 78 is formed in a U shape that opens toward the garnish 8. The clip section 78 is formed of a metal material such as iron, aluminum, or the like. The clip section 78 has an attachment piece 74, a curved section 18, a facing section 19 and a locking piece 79.

The attachment piece 74 is formed in a plate shape. The attachment piece 74 is adhered to a surface of the connecting section 77 of the garnish fixing part 75 facing an inward side in the vehicle width direction by an adhesive agent. Further, the attachment piece 74 is fixed to the garnish fixing part 75 by a fastening member such as a rivet, a bolt, or the like.

The facing section 19 is disposed to face the locking piece 79 on a side further inward in the vehicle width direction than the attachment piece 74.

The curved section 18 connects the attachment piece 74 and the facing section 19. The curved section 18 is connected to the end portions of the attachment piece 74 and the facing section 19 on an inward side in the passenger compartment. The curved section 18 is curved in a semi-circular shape that opens toward the garnish 8.

The locking piece 79 protrudes from the facing section 19 toward the attachment piece 74. The garnish 8 can be engaged with the locking piece 79 when the garnish 8 is attached to the stud 7.

The garnish 8 is attached to the clip section 78 formed in this way from an outer side of the passenger compartment. Meanwhile, the garnish 8 is separable from the clip section 78 as the engaging section 88 (see FIG. 5) slidably moves with respect to the clip section 78 in the lengthwise direction of the garnish 8.

(Garnish)

Referring to FIG. 5, the garnish 8 is formed in an elongated shape in the extension direction of the stud 7. The garnish 8 covers the stud 7 from the outside of the passenger compartment. The garnish 8 is attached to the stud 7 via the garnish fixing part 75 provided on the front support section 71. The garnish 8 has an outer part 81, an inner part 82, an inner seal section 83 and an outer seal section 84.

The outer part 81 is disposed on the outermost side of the passenger compartment. The outer part 81 has a design surface 91 facing outside from the passenger compartment, an inner seal attachment leg section 92, and a support piece 93. The outer part 81 is formed of, for example, a resin material or the like on which paint has good application properties. The outer part 81 covers a gap S between the end portions of the front glass 2 and the subsidiary glass 3 from the outer side of the passenger compartment.

The inner seal attachment leg section 92 protrudes from the surface of the outer part 81 facing the inner side of the passenger compartment toward the front glass 2. The inner seal attachment leg section 92 is provided further inward in the vehicle width direction than the connecting section 77. A protrusion height of the inner seal attachment leg section 92 is increased from above toward below in the extension direction of the garnish 8.

A head section 93t of the support piece 93 is welded to the inner part 82 while the support piece 93 passes through the inner part 82 in the thickness direction in a central section of the support piece 93 in the extension direction of the garnish 8. As shown in FIG. 8, at a lower end portion of the garnish 8 in the extension direction, the support piece 93 is formed such that a dimension of the support piece 93 closer to the side of the stud 7 is longer than that of the support piece 93 at a central section in the extension direction (a state in FIG. 5). In the lower end portion of the garnish 8 in the extension direction, the support piece 93 is fastened and fixed to the extension section 41 by a bolt 15 and a nut 14. Accordingly, the garnish 8 is fixed to the upper member 4 (see FIG. 2) via the extension section 41.

As shown in FIG. 5, the inner part 82 is provided on a side further inward in the passenger compartment than the outer part 81. The inner part 82 is connected to a surface of the outer part 81 on an inward side of the passenger compartment. The inner part 82 is formed of, for example, a resin material or the like having higher rigidity than that of the outer part 81. The inner part 82 has an extending section 85, a protrusion section 86 and a swelling section 87 (see FIG. 7).

The extending section 85 extends along a surface of the outer part 81 facing an inner side of the passenger compartment. The extending section 85 is fixed to the outer part 81. Specifically, since the head section 93t of the support piece 93 is welded to the extending section 85 while the support piece 93 of the outer part 81 passes through the extending section 85, the extending section 85 (the inner part 82) is fixed to the outer part 81.

The protrusion section 86 protrudes from the extending section 85 toward an inner side of the passenger compartment. Specifically, the protrusion section 86 is disposed in the gap S between the end portions of the front glass 2 and the subsidiary glass 3 and protrudes toward the connecting section 77 of the garnish fixing part 75. The engaging section 88 is provided on a tip of the protrusion section 86. The engaging section 88 has a stepped section 89 that is engageable with the clip section 78 provided on the stud 7. In other words, since the stepped section 89 of the engaging section 88 is engaged with the locking piece 79 of the clip section 78, the garnish 8 is attached to the stud 7.

The plurality of protrusion sections 86 are provided at predetermined intervals in the extension direction of the garnish 8. As shown in FIG. 6, the inner part 82 is welded to a second support piece 94 extending from the outer part 81 between the neighboring protrusion sections 86 and 86 in the extension direction of the garnish 8. Specifically, a head section 94*t* of the second support piece 94 is welded to the extending section 85 while the second support piece 94 passes through the extending section 85 of the inner part 82. The second support piece 94 is provided further outward in the vehicle width direction than the support piece 93 (see FIG. 5).

As shown in FIG. 7, in the lower portion of the garnish 8 in the extension direction, a length of the protrusion section 86 is greater than a length of the protrusion section 86 in the central section in the extension direction (the protrusion section 86 in FIG. 5). Accordingly, a distance between the garnish 8 and the stud 7 is gradually increased from above toward below in the extension direction of the garnish.

The swelling section 87 protrudes from an end portion of the extending section 85 on an outward side in the vehicle width direction toward an outward side in the vehicle width direction. The swelling section 87 is formed integrally with the extending section 85. The swelling section 87 is not yet formed above an intermediate section of the garnish 8 in the extension direction (see FIG. 5 and FIG. 6), and is formed on the inner part 82 at below the intermediate section of the garnish 8 in the extension direction (see FIG. 7 and FIG. 8). In other words, the swelling section 87 gradually protrudes from the extending section 85 toward an outward side in the vehicle width direction as it goes from above toward below the garnish 8 in the extension direction. As shown in FIG. 7, the swelling section 87 is disposed between the outer part 81 and the subsidiary side seal member 32 below the garnish 8 in the extension direction. In this way, a thickness of the swelling section 87 is made relatively thin at a portion where the subsidiary side seal member 32 is attached switches from the outer part 81 to the swelling section 87. Meanwhile, as shown in FIG. 8, the thickness of the swelling section 87 is gradually increased downward in the extension direction.

Accordingly, at the portion where the subsidiary side seal member 32 is attached switches from the outer part 81 to the swelling section 87, a gap between the subsidiary side seal member 32 and the outer part 81 or the swelling section 87 is minimized, and sealability can be highly maintained. Meanwhile, since the garnish 8 is disposed at a further outward side of the passenger compartment than the upper section thereof in the extension direction due to the increase of the thickness of the swelling section 87 at below in the extension direction, a design line of the outer part 81 of the garnish 8 and a design line of the fender panel disposed below the front pillar 5 can be smoothly connected to each other.

The inner seal section 83 is attached to the tip of the inner seal attachment leg section 92. The inner seal section 83 is in contact with the front glass 2. A space between the front glass 2 and the garnish 8 is sealed by the inner seal section 83.

The outer seal section 84 is attached to the swelling section 87 below the garnish 8 in the extension direction, and attached to the outer part 81 at above the garnish 8 in the extension direction (see also FIG. 5). The outer seal section 84 is in contact with the subsidiary glass 3. A space between the subsidiary glass 3 and the garnish 8 is sealed by the outer seal section 84.

Figure 10:
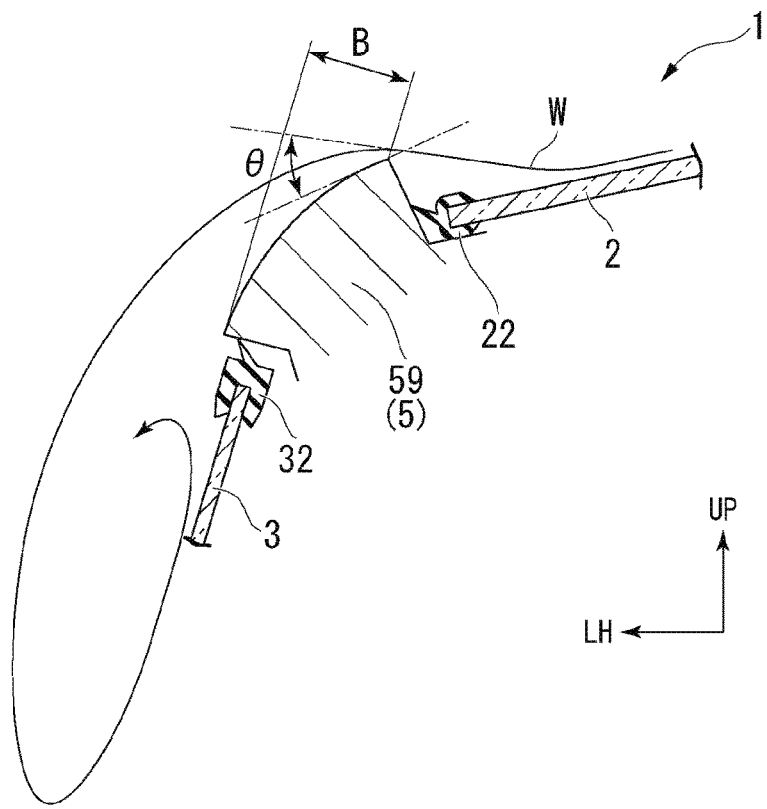
FIG. 10 is a schematic view showing a flow of a fluid around the vehicle body front structure according to the embodiment.
Figure 11:
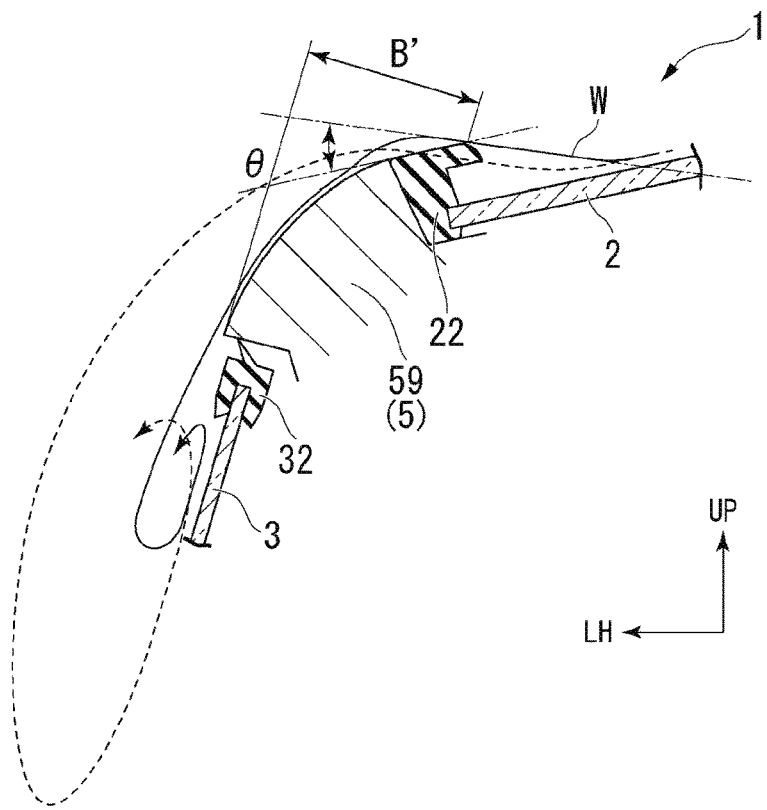
FIG. 11 is a schematic view showing a flow of a fluid around a vehicle body front structure according to the related art.

FIG. 10 is a schematic view showing a flow of a fluid around the vehicle body front structure 1 according to the embodiment. FIG. 11 is a schematic view showing a flow of a fluid around the vehicle body front structure 1 according to the related art.

As shown in FIG. 10, the vehicle body front structure 1 of the embodiment has a pillar width B when seen in the forward/rearward direction that is smaller than a pillar width B' (see FIG. 11) in the related art in a corner section between the front glass 2 and the subsidiary glass 3. In addition, an inclination angle θ of the front pillar 5 with respect to a stream direction of a wind W input from the front of the vehicle body 10 is greater than an inclination angle θ' (see FIG. 11) in the related art. Accordingly, a strong separation vortex occurs around the front pillar 5 throughout a wider range than in the related art. Accordingly, an increase in wind noise generated due to the wind input into the vehicle body 10 is minimized, and sound insulating properties of the vehicle body 10 are improved in comparison with the related art.

Actions and Effects

Next, actions and effects of the vehicle body front structure 1 will be described.

According to the vehicle body front structure 1 of the embodiment, the garnish 8 has the engaging section 88, and the engaging section 88 is engaged with the clip section 78 of the front pillar 5 while the engaging section 88 is disposed in the gap S between the front glass 2 and the subsidiary glass 3 and stands up toward the front pillar 5. Accordingly, the garnish 8 can be fixed to the front pillar 5. Accordingly, fixing strength of the garnish 8 can be increased. In addition, since the end portions of the front glass 2 and the subsidiary glass 3 are disposed adjacent to each other, a field of vision of a driver can be widened by reducing a width dimension of the front pillar 5.

Since the engaging section 88 is provided on the garnish 8 and the garnish 8 can be fixed to the front pillar 5 by simply providing the clip section 78 on the front pillar 5, a degree of freedom in design can be improved while the garnish 8 and the front pillar 5 are simply configured.

Accordingly, it is possible to provide the vehicle body front structure 1 that can be manufactured at low cost and having an improved degree of freedom in design while a field of vision of a driver is improved.

Since the front pillar 5 has the connecting section 77 extending toward the garnish 8 and the clip section 78 is provided on the connecting section 77, the clip section 78 can be disposed in the narrow gap S between the front glass 2 and the subsidiary glass 3. Accordingly, even when the end portions of the front glass 2 and the subsidiary glass 3 are disposed adjacent to each other and the width dimension of the front pillar 5 is reduced, the garnish 8 can be reliably fixed to the front pillar 5.

Since the garnish 8 includes the inner part 82 and the outer part 81, design properties, i.e., a degree of freedom in design of the vehicle body can be improved by, for example, using different molds upon molding of the inner part 82 and the outer part 81. In addition, the inner part 82 may be formed of, for example, a resin material or the like having high rigidity to facilitate mounting on the front pillar 5, and the outer part 81 may be formed of, for example, a resin material or the like on which paint has good application properties to improve design properties. In this way, rigidity and fixing strength of the garnish 8 can be increased by selecting materials of the parts according to uses thereof. In addition, since the inner part 82 is formed of a material having higher rigidity than that of the outer part 81, the inner part 82 can be easily mounted on the clip section 78 formed of, for example, a metal material having high rigidity. Accordingly, it is possible to provide the vehicle body front structure 1 that can be manufactured at low cost and having an improved degree of freedom in design.

In particular, since the inner part 82 is formed of a material having higher rigidity than that of the outer part 81, insertion into the hard clip section 78 formed of a metal material can be easily performed while rigidity of the garnish 8 is increased.

Since the thickness of the outer seal section 84 side of the inner part 82 increases from above toward below, a design line of the outer part 81 and a design line of the fender panel disposed below the front pillar 5 can be made to be smoothly continuous. Accordingly, it is possible to provide the vehicle body front structure 1 that has improved appearance of the vehicle body 10.

Since the height of the inner seal attachment leg section 92 provided on the side of the inner seal section 83 of the outer part 81 is increased from above toward below, the design line of the outer part 81 and the design line of the fender panel disposed below the front pillar 5 can be made to be smoothly continuous. Accordingly, it is possible to provide the vehicle body front structure 1 having improved appearance of the vehicle body 10.

Since the inner seal section 83 is fixed to the inner part 82 and the outer seal section 84 is fixed to at least one of the inner part 82 and the outer part 81, adhesion between the glasses 2 and 3 and the garnish 8 can be increased, and intrusion of water, dust, or the like, between the garnish 8 and the glasses 2 and 3 can be minimized.

The outer part 81 has the support piece 93, and the garnish 8 is fixed to the vehicle body as the support piece 93 is fastened and fixed to the extension section 41. According to the configuration, even when the engaging section 88 of the inner part 82 is separated from the clip section 78 due to, for example, traveling air or the like, the garnish 8 can be fixed to the vehicle body. Accordingly, fixing strength of the garnish 8 and safety of the vehicle body can be improved.

Since the head section 93t of the support piece 93 is welded to the inner part 82 while the support piece 93 passes through the inner part 82 in the thickness direction, the outer part 81 and the inner part 82 can be strongly fixed. Accordingly, fixing strength of the garnish 8 can be improved.

Since the stepped section 89 of the engaging section 88 is engaged with the locking piece 79 of the clip section 78, the garnish 8 can be fixed to the front pillar 5. In addition, since the engaging section 88 is moved with respect to the clip section 78 in the lengthwise direction of the front pillar 5, the engaging section 88 can be separated from the clip section 78. Accordingly, the garnish 8 can be easily removed from the front pillar 5 as the garnish 8 is moved in the lengthwise direction. Accordingly, it is possible to provide the vehicle body front structure 1 capable of facilitating attachment and detachment of the garnish 8 while the garnish 8 is strongly fixed.

Since the stud 7 (the front pillar 5) is formed in a V-shaped cross section, the front pillar 5 can be easily manufactured while the strength of the front pillar 5 is increased and the width is reduced. Since at least one of the front support section 71 and the side support section 72 has the garnish fixing part 75, the garnish 8 can be easily attached to the front pillar 5 by attaching the garnish 8 to the garnish fixing part 75. In particular, when the garnish fixing part 75 is fixed to the front support section 71 to which the front glass 2 is attached, since the front support section 71 is reinforced by the garnish fixing part 75, it is possible to secure sufficient support strength with respect to the front glass 2 having a larger weight than that of the subsidiary glass 3.

Further, the technical scope of the present invention is not limited to the above-mentioned embodiment and various modifications may be made without departing from the scope of the present invention.

For example, in the embodiment, while the stud 7 is formed by overlapping the first plate member 51 and the second plate member 52, the number of overlapping plate members is not limited to two. The studs 7 may be formed by overlapping the plurality of (three or more) plate members.

The outer part 81 and the inner part 82 of the garnish 8 may be formed of a material other than the resin material.

The garnish fixing part 75 may be fixed to the side support section 72.

In the embodiment, while the thickness of the swelling section 87 of the inner part 82 is increased from above toward below the garnish 8 in the extension direction, the thickness of the swelling section 87 may be constant.

The head section 93t of the support piece 93 and the head section 94t of the second support piece 94 may not be welded to the inner part 82. That is, the inner part 82 is caulked and fixed through thermal deformation, so-called thermal caulking, of the head section 93t of the support piece 93 and the head section 94t of the second support piece 94.

The vehicle body 10 may be a vehicle body of an engine vehicle on which an engine is mounted, or may be a vehicle body of an electric automobile, a hybrid automobile, or the like, on which a motor is mounted.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body front structure comprising:
a front pillar extending in an upward/downward direction;
a front glass disposed further inward in a vehicle width direction of a vehicle body than the front pillar;
a subsidiary glass disposed further outward in the vehicle width direction than the front glass; and
a garnish configured to cover a gap provided between end portions of the front glass and the subsidiary glass, and to cover the front pillar from an outside of a passenger compartment,
wherein the garnish has an engaging section disposed in the gap and standing up toward the front pillar,
the front pillar has a clip section to which the engaging section is able to engage,
wherein the garnish comprises:
an outer part having a design surface facing outside from the passenger compartment;
an inner part provided at inner side of the passenger compartment than the outer part and in which the engaging section is formed;
an inner seal section in contact with the front glass; and
an outer seal section in contact with the subsidiary glass,
wherein a thickness of the outer seal section side of the inner part increases from above toward below in the upward/downward direction, the inner part has a swelling section which is formed below an intermediate section of the garnish in an extension direction of the garnish, and the swelling section gradually protrudes toward an outward side in the vehicle width direction as it goes downward from the intermediate section in the extension direction, and a thickness of the swelling section gradually increases as it goes downward in the extension direction.

2. The vehicle body front structure according to claim 1, wherein the front pillar has a connecting section extending toward the garnish, and the clip section is provided on the connecting section.

3. The vehicle body front structure according to claim 1, wherein a height of an inner seal attachment leg section of the outer part provided at the side of the inner seal section increases from above toward below in the upward/downward direction.

4. The vehicle body front structure according to claim 1, wherein the inner seal section is fixed to the outer part, and the outer seal section is fixed to at least one of the inner part and the outer part.

5. The vehicle body front structure according to claim 1, wherein the outer part has a support piece extending toward an inner side of the passenger compartment, and the support piece is fastened and fixed to an extension section extending upward from the vehicle body at a lower end side in the upward/downward direction.

6. The vehicle body front structure according to claim 5, wherein a head section of the support piece and the inner part are welded to each other while the support piece passes through the inner part in a thickness direction of the inner part.

7. The vehicle body front structure according to claim 1, wherein the clip section has a locking piece, the engaging section has a stepped section engaged with the locking piece, and the garnish is separable from the clip section when the engaging section is moved with respect to the clip section in a lengthwise direction of the front pillar.

8. The vehicle body front structure according to claim 1, wherein the front pillar is formed in a V-shaped cross section by a front support section to which the front glass is attached, and a side support section disposed further outward in the vehicle width direction than the front support section and to which the subsidiary glass is attached, and at least one of the front support section and the side support section is attached with a garnish fixing part to which the garnish is attached.

* * * * *